United States Patent
Strand et al.

(10) Patent No.: US 9,059,938 B1
(45) Date of Patent: Jun. 16, 2015

(54) MANAGING REQUESTS OF WEBSITE SERVERS

(71) Applicant: Amazon Technologies, Inc., Seattle, WA (US)

(72) Inventors: William Alexander Strand, Issaquah, WA (US); Aaron D. Son, Seattle, WA (US); Feras Karablieh, Issaquah, WA (US); Soumya Sanyal, Seattle, WA (US); Eric Docktor, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 121 days.

(21) Appl. No.: 13/621,573

(22) Filed: Sep. 17, 2012

(51) Int. Cl.
*G06F 15/173* (2006.01)
*H04L 12/24* (2006.01)

(52) U.S. Cl.
CPC ...................... *H04L 41/50* (2013.01)

(58) Field of Classification Search
CPC ................ H04L 67/1002; H04L 67/1008
USPC .................... 709/219, 223, 225, 226
See application file for complete search history.

(56) References Cited

U.S. PATENT DOCUMENTS

| | | | | |
|---|---|---|---|---|
| 7,099,933 | B1* | 8/2006 | Wallace et al. | 709/223 |
| 7,231,445 | B1* | 6/2007 | Aweya et al. | 709/226 |
| 7,257,515 | B2* | 8/2007 | Haeuptle | 702/185 |
| 8,112,471 | B2* | 2/2012 | Wei et al. | 709/202 |
| 2002/0174219 | A1 | 11/2002 | Mei et al. | |

\* cited by examiner

*Primary Examiner* — Mohamed Wasel
(74) *Attorney, Agent, or Firm* — Baker & Hostetler LLP (57) ABSTRACT

A request for a webpage or a service of a website server is sent from a user computing device to a proxy website server. The proxy website server can receive information from a website server indicative of a usage level of the website server. The proxy website server can determine whether to send the request to the website server based on usage of the website server compared to a capacity threshold. The proxy website server can send a response to the user computing device which includes either the requested webpage or service from the website server or an error message.

24 Claims, 9 Drawing Sheets

MANAGING REQUESTS OF WEBSITE SERVERS

BACKGROUND

Websites do not have infinite capacity. Website capacity is constrained by the maximum throughput of the least-scaled service provided by the website. Website services can throttle or otherwise fail to service requests that push them beyond their capacity. The maximum throughput of a website can change due to underlying changes in dependent services and the nature of decoupled service development. An understanding of the capacity of the website at any given moment is difficult to ascertain with any certainty, unless load testing is performed to determine how many orders per minute the website can handle. When traffic demand exceeds capacity, the result is unpredictable and website users can have a poor or unsuccessful experience. Website users can experience increased latency and timeouts as their requests are queued. Service failures can compound, resulting in a prolonged request drops.

When customer demand exceeds website capacity, services can either fail a percentage of requests or start servicing all requests with increased latency. This causes non-linear failure that can prevent websites from reaching the highest maximum load and continuing to operate at that throughput. In other words, once capacity is reached, the number of successful requests drops and the number of customers with a failed or unsuccessful experience increases.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Embodiments of systems and methods are described for responding to website user requests when a website exceeds capacity. Requests can be handled in a way that conserves website server capacity during times of high load. Responses to user requests can be aimed at allowing the maximum number of website users continue to use the website unaffected. Responses to user requests can also be aimed at discouraging website users from browsing away from the website while the website is temporarily unavailable. Responses to user requests can also be aimed at keeping website users informed of the status of the website.

Figure 1:
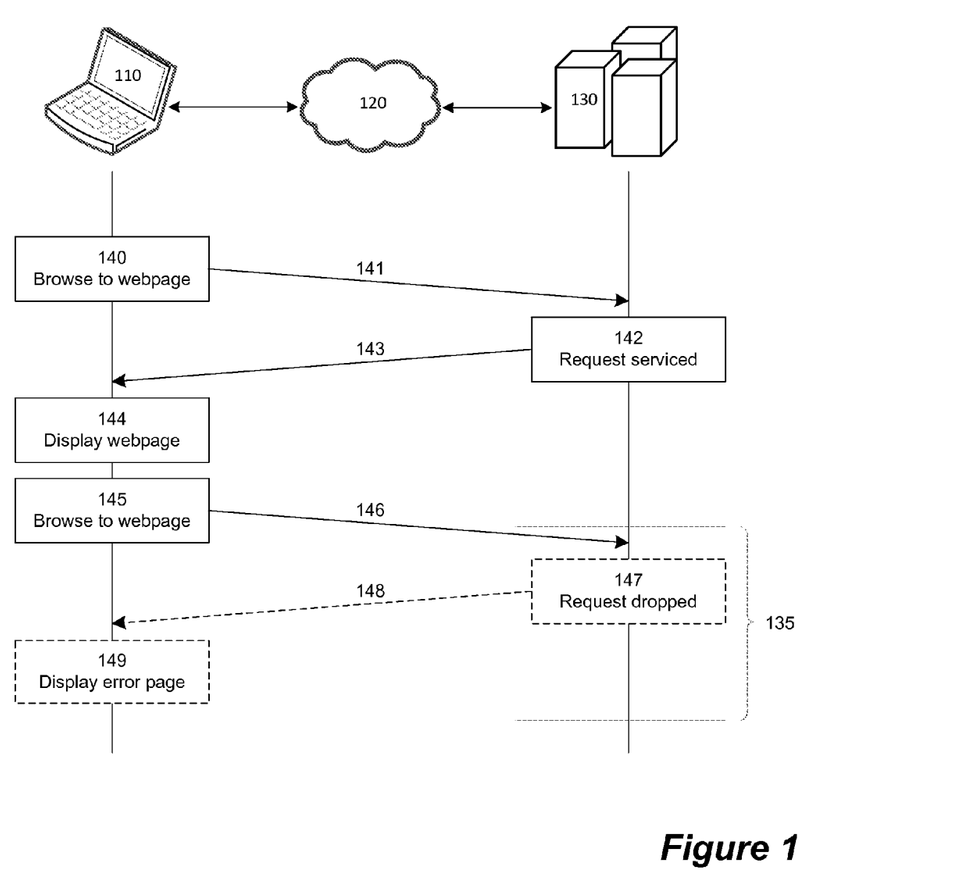
FIG. 1 depicts a system and method of a website user's experience before and during a time of website unavailability.

FIG. 1 depicts a system and method of a website user's experience before and during a time of website unavailability. As depicted in FIG. 1, a user computing device 110 can be connected via a network 120 to a website server 130. The user computing device 110 can be a desktop computer, a laptop computer, a tablet, a cell phone, a handheld computer device, or any other form of computing device. The user computing device 110 can include a web browser than allows the user to browse to and display various webpages. Network 120 can be one or more communication networks, such as the internet, a wireless network, a wired network, a local area network, a wide area network, and the like. Website server 130 can be a single server, a set of servers, a set of tiered servers, or any similar configuration of one or more servers. Depicted beneath the user computing device 110, the network 120, and the website server 130 is a method of the user computing device 110 browsing to a website before and during a time 135 that at least a portion the website server 130 is unavailable to process a request from the user computing device 110 due to a high volume of use.

At block 140, a user of user computing device 110 browses to a webpage associated with the website. Browsing to a website can include a user selecting a link associated with a particular webpage, entering an address of a particular webpage into a browser address bar, or any other method of browsing to a webpage associated with the website. In response to a user browsing 140 to the webpage, a request 141 is sent from the user computing device 110 to the website server 130. The request 141 can be any form of a request to the website, such as a GET request or a POST request. After the website server 130 receives the request 141, it services 142 the request and sends a response 143 to the user computing device 110. The response 143 can include information for displaying the requested webpage. After receiving the response 143, the user computing device 110 displays 144 the requested webpage. Subsequently, a user of the user computing device 110 may browse 145 to a second webpage associated with the website. The second webpage may be a detail information page, a transaction page, or any other webpage associated with the website. After browsing 145 to the second webpage, the user computing device 110 sends a second request 146 to the website server 130. However, during the time 135 depicted in FIG. 1, at least a portion the website server 130 is unavailable to process a request from the user computing device 110 due to a high volume of use. Thus, when the website server 130 receives the second request 146, the website server 130 cannot service the second request 146 and the website server 130 drops 147 the request. A response 148 is sent back to the user computing device 110 indicating that the website server 130 is unavailable. In one embodiment, the response 148 is an HTTP 503 error response. After receiving the response 148, the user computing device 110 displays 149 an error page indicating that request 146 from the user computing device 110 was not successful.

When customer demand exceeds capacity, such as during the time 135 depicted in FIG. 1, operators of the website server 130 can provision additional capacity. Ideally, the provisioning of additional capacity would be done in the shortest time possible. However, while it would be preferable to provision capacity within minutes, efforts to add additional capacity to website server 130 can take hours or even days. In addition, because the website server 130 is continuing to receive additional user requests while it is over capacity, the ability of the website server 130 to successfully service additional requests decreases.

Figure 2:
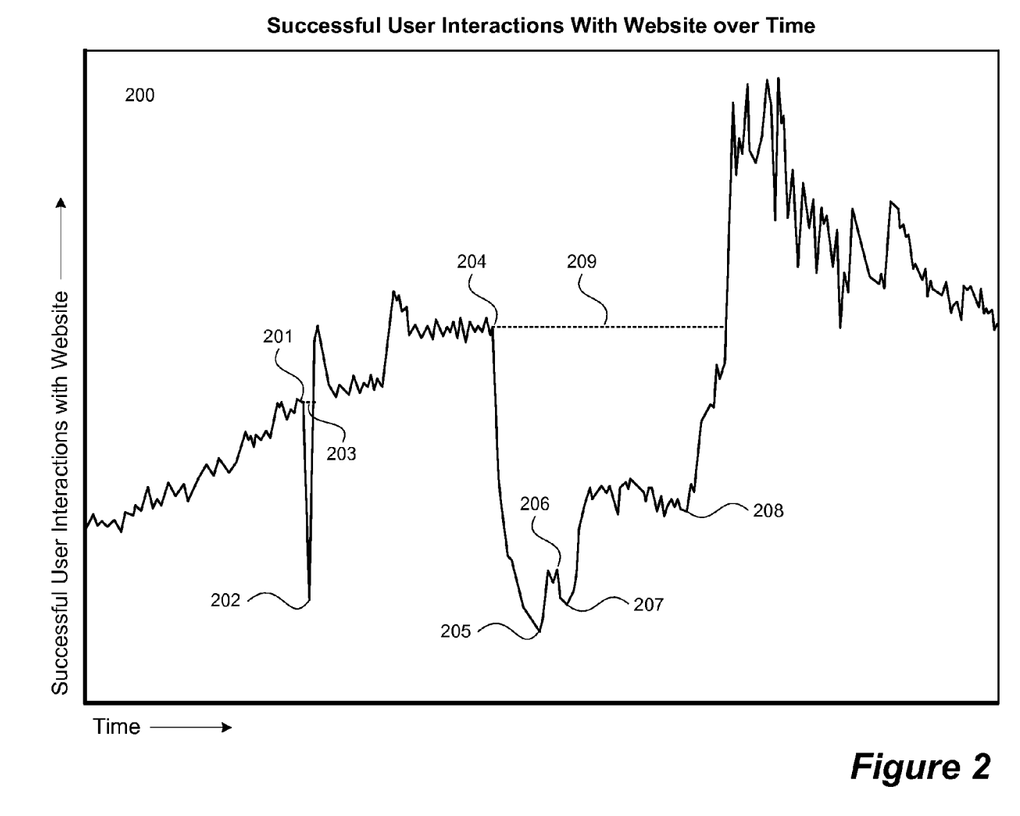
FIG. 2 depicts a chart showing successful user interactions with a website over time as website server capacities fail.

Referring now to FIG. 2, depicted is a chart 200 showing an example of successful user interactions with a website over time as website server capacities fail. From the left side of chart 200, the successful numbers of user interactions with the website are rising as usage of the website is increasing. At point 201, the usage of at least a portion of the website hits a capacity limit and the numbers of successful interactions with the website drop dramatically. At point 202, additional capacity of the website is provisioned and the levels of successful user interactions with the website return to pre-failure levels. The dashed line 203 represents an approximate level at which user interactions could have continued successfully had the number of user requests been limited to that level. After new capacity was added at point 202, the levels of successful user interaction returned to pre-failure levels and continued to increase as demand for the website increased. At point 204, the usage of at least a portion of the website hits a capacity limit and the numbers of successful interactions with the website again drop dramatically. The relationship of the number of successful user interactions with a website and the portion of the website that is beyond capacity can be non-linear due to a number of factors. One factor is that failure of a portion of the website can increase overall traffic to and from the website. As overall traffic to and from the website increases, the latency between user's requests and successful responses increases. Another factor is that various portions or services of a website may be dependent on other services or portions properly operating. Thus, availability disruptions in a component's dependencies can have cascading effects. In the example in FIG. 2, the failure of a small portion of the website can result in the dramatic drop in successful interactions with the website shown to the right of point 204. At point 205, additional capacity is provisioned to respond to the failure at point 204. However, as successful user interactions increase after point 205, a secondary failure occurs at point 206. This secondary failure again causes the numbers of successful interactions with the website to drop. At point 207, additional capacity is provisioned to respond to the failure at point 206. However, the additional capacity added at point 207 is insufficient to return successful user interactions to the level before the failure at point 204. At point 208, even further capacity is provisioned, allowing the number of successful user interactions with the website to exceed the levels before the failure at point 204 and allowing the website to successfully handle the demand for website requests during the remaining time shown in chart 200. The dashed line 209 represents an approximate level at which user interactions could have continued successfully had the number of user requests been limited to that level before the failure of the website at point 204. Furthermore, limiting number of user interactions to the approximate level 209 may have prevented both the failure at point 204 and the failure at point 206 as the failure at point 206 may have been a result of the failure at point 206.

Safeguards can be implemented to maintain successful user interactions at or near capacity of a website by limiting user requests that are sent to a website server that would overload the website server. During this time of safeguarding, the greatest numbers of successful user interactions could be handled while additional website capacity could be provisioned. In some embodiments, such safeguards would have a low service cost by not adding load to those services of the website that are at or near capacity while providing users with some form of a user experience with the website. In other embodiments, such safeguards would be scalable to protect the website and improve user experiences with the website, regardless of the level of capacity at any given time. In other embodiments, such safeguards would permit users that have already engaged with the website to continue successfully engaging with the website as much as possible, while limiting the number of new users to begin engaging with the website. In other embodiments, such safeguards would inform users as to why their requests cannot be serviced by the website, approximately when the website will be able to service their requests, what behavior can be expected of the user, and whether their failed request will be queued and performed later or whether their failed request will need to be retried.

Figure 3:
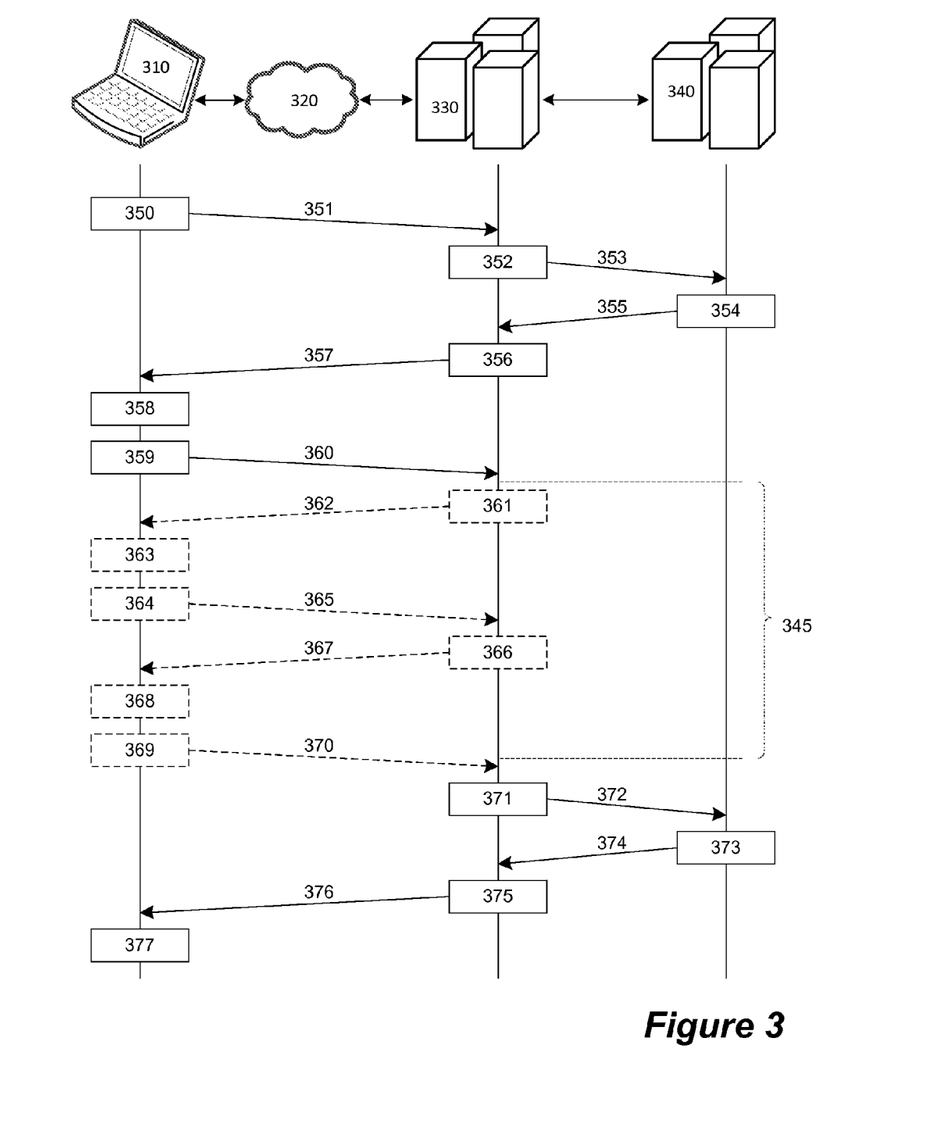
FIGS. 3 and 4 depict embodiments of systems and methods of a website user's experience before, during, and after a time of website unavailability.

FIG. 3 depicts embodiments of a system and method of a website user's experience before, during, and after a time of website unavailability. As depicted in FIG. 3, a user computing device 310 can be connected via a network 320 to a proxy website server 330. The proxy website server 330 is connected to a website server 340. The user computing device 310 can be a desktop computer, a laptop computer, a tablet, a cell phone, a handheld computer device, or any other form of computing device. The user computing device 310 can include a web browser than allows the user to browse to and display various websites. Network 320 can be one or more communication networks, such as the internet, a wireless network, a wired network, a local area network, a wide area network, and the like. The proxy webserver 330 can receive requests from users to interact with various webpages or services of the website and rout the requests to the website server 340 accordingly. The proxy webserver 330 can be a single server, a set of servers, a set of tiered servers, or any similar configuration of one or more servers. The website server 340 can be a single server, a set of servers, a set of tiered servers, or any similar configuration of one or more servers. Depicted beneath the user computing device 310, the network 320, the proxy website server 330, and the website server 340 is a method of the user computing device 310 browsing to a website before and during a time 345 that at least a portion the website server 330 is unavailable to process a request from the user computing device 310 due to a high volume of use.

At block 350, a user of user computing device 310 browses to a webpage associated with the website. In response to a user browsing 350 to the webpage, a request 351 is sent from the user computing device 310 to the proxy website server 330. The request 351 can be any form of a request to the website, such as a GET request or a POST request. After the receiving the request 351, website proxy server 330 determines 352 whether the request 351 should be passed on to website server 340. In some embodiments, a determination as to whether a request from a user computing device should be passed on to website server can be based on information about the user or the user computing device, information about the current session of the user computing device, and information about a perceived intent of the user. In other embodiments, a determination as to whether a request from a user computing device should be passed on to website server can be based on information about the website server, such as the portion or portions of the website server that are already operating at or near capacity. Various embodiments of such a determination are discussed in greater detail below. In the particular embodiment shown in FIG. 3, the website proxy server 330 determines 352 to send request 353 to the website server 340. At block 354, the website server 340 services the request and sends a response 355 to the website proxy server 330. The website proxy server 330 receives the response 355 from the website server 340 and sends 356 a corresponding response 357 to the user computing device 310. The response 357 can include information for displaying the requested webpage. After receiving the response 357, the user computing device 310 displays 358 the requested webpage.

Subsequently, a user of the user computing device 310 may browse 359 to a second webpage associated with the website. After browsing 359 to the second webpage, the user computing device 310 sends a second request 360 to the proxy website server 330. However, during the time 345 depicted in FIG. 3, at least a portion the website server 330 is unavailable to process a request from the user computing device 310 due to a high volume of use. At block 361, the proxy website server 330 makes a decision as to whether request 360 should be passed on to the website server 340. In the particular embodiment shown in FIG. 3, the website proxy server 330 determines 360 not to send request 359 to the website server 340. For example, the proxy website server 330 may have information that the website server 340 is operating at or near capacity and that passing request 359 on to website server 340 may risk overloading website server 340. After the proxy website server 330 makes the decision 361 not to pass request 362 on to website server 340, proxy website server 330 sends a response 361 back to user computing device 310. In some embodiments, the response 361 can include an indication that the requested webpage is not available, an indication of a time at which the requested webpage is available, an indication of a portion of the website that is available to be serviced by website server 340, any similar information, or any combination thereof. Various embodiments of such a response are described in more detail below. At block 363, the user computing device 310 displays an error message, with some or all of the information provided by the proxy website server 330 in the response 362.

At block 364, a third request 365 may be sent from user computing device 310 to proxy website server 330. The third request 365 may be initiated by a user selecting a link to a webpage or service associated with the website, by a user browsing to a webpage address associated with the website, by a browser of the user computing device 310 after a specific period of time, or by any other action. In one embodiment, the response 362 can include an estimated time that the website will be unavailable, and a browser of user computing device 310 can be configured to automatically send the third request 365 after the estimated period of time elapses. After receiving the third request 365, the proxy website server 330 decides 366 whether to pass request 365 to website server 340. In the particular embodiment shown in FIG. 3, the website proxy server 330 determines 366 not to send request 365 to the website server 340. For example, the proxy website server 330 may have information that the website server 340 is still operating at or near capacity and that passing request 365 on to website server 340 may risk overloading website server 340. After the proxy website server 330 makes the decision 366 not to pass request 365 on to website server 340, proxy website server 330 sends a response 367 back to user computing device 310. Various embodiments of such a response are described in more detail above and below. At block 368, the user computing device 310 displays an error message, with some or all of the information provided by the proxy website server 330 in the response 367.

In one embodiment, the first response 362 during the time 345 that the website server 340 is unavailable includes a first estimated period of time that the website will be unavailable. When the proxy website server 330 makes a decision 366 that the website server 340 is still unavailable, the proxy website server 330 can provide a second estimated period of time that the website will be unavailable. In one embodiment, the proxy website server 330 increases the estimated period of time for each request from the user computing device. In other words, the first estimated period of time provided in response 362 can be less than the second estimated period of time provided in response 367. For example, the first estimated period of time provided in response 362 can be 7 seconds and the second estimated period of time provided in response 367 can be 15 seconds.

At block 369, a fourth request 370 may be sent from user computing device 310 to proxy website server 330. The fourth request 370 may be initiated by a user selecting a link to a webpage or service associated with the website, by a user browsing to a webpage address associated with the website, by a browser of the user computing device 310 after a specific period of time, or by any other action. After receiving the fourth request 370, the proxy website server 330 determines 371 whether to pass request 365 to website server 340. In the particular embodiment shown in FIG. 3, the website proxy server 330 determines 371 to pass the request to the website server 340. For example, the proxy website server 330 may have information that the website server 340 is now operating sufficiently below capacity that passing request 370 on to website server 340 will not risk overloading website server 340, or the proxy website server 330 may have information that additional capacity of the website server 340 has been provisioned and that passing request 370 on to website server 340 will not risk overloading website server 340. After the proxy website server 330 makes the decision 366 to pass request 365 on to website server 340, proxy website server 330 sends request 372 to website server 340. At block 373, the website server 340 services the request 372 and sends a response 374 to the website proxy server 330. The website proxy server 330 receives the response 374 from the website server 340 and sends 375 a corresponding response 376 to the user computing device 310. The response 376 can include information for displaying the requested webpage. After receiving the response 376, the user computing device 310 displays 377 the requested webpage.

Figure 4:
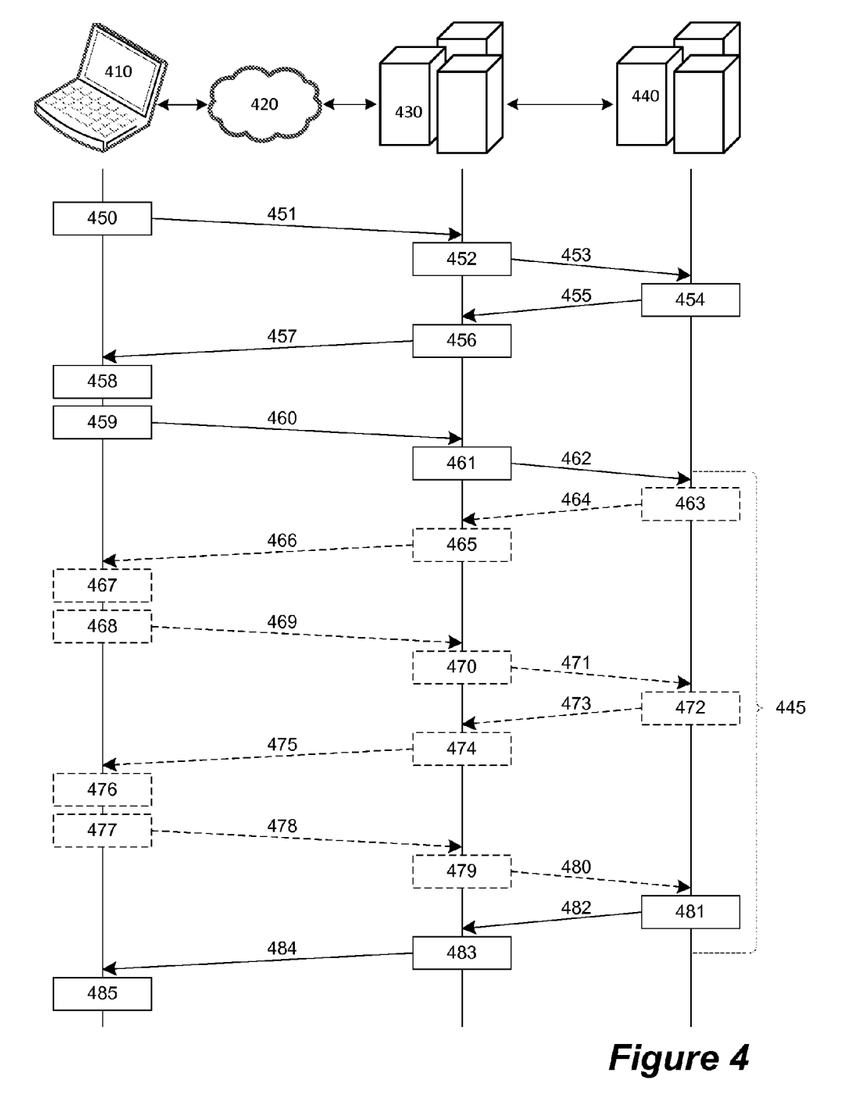

FIG. 4 depicts embodiments of a system and method of a website user's experience before, during, and after a time of website unavailability. As depicted in FIG. 4, a user computing device 410 can be connected via a network 420 to a proxy website server 430. The proxy website server 430 is connected to a website server 440. The user computing device 410 can be a desktop computer, a laptop computer, a tablet, a cell phone, a handheld computer device, or any other form of computing device. The user computing device 410 can include a web browser than allows the user to browse to and display various websites. Network 420 can be one or more communication networks, such as the internet, a wireless network, a wired network, a local area network, a wide area network, and the like. The proxy webserver 430 can receive requests from users to interact with various webpages or services of the website and rout the requests to the website server 440 accordingly. The proxy webserver 430 can be a single server, a set of servers, a set of tiered servers, or any similar configuration of one or more servers. The website server 440 can be a single server, a set of servers, a set of tiered servers, or any similar configuration of one or more servers. Depicted below the user computing device 410, the network 420, the proxy website server 430, and the website server 440 is a method of the user computing device 410 browsing to a website before and during a time 445 that at least a portion the website server 430 is unavailable to process a request from the user computing device 410 due to a high volume of use.

At block 450, a user of user computing device 410 browses to a webpage associated with the website. In response to a user browsing 450 to the webpage, a request 451 is sent from the user computing device 410 to the proxy website server 430. The request 451 can be any form of a request to the website, such as a GET request or a POST request. After the website proxy server 430 receives the request 451, makes a determination as to whether the request 451 should be passed on to website server 440. In the particular embodiment shown in FIG. 4, the website proxy server 430 determines 452 to send request 453 to the website server 440. At block 454, the website server 440 services the request and sends a response 455 to the website proxy server 430. The website proxy server 430 receives the response 455 from the website server 440 and sends 456 a corresponding response 457 to the user computing device 410. The response 457 can include information for displaying the requested webpage. After receiving the response 457, the user computing device 410 displays 458 the requested webpage.

Subsequently, a user of the user computing device 410 may browse 459 to a second webpage associated with the website. After browsing 459 to the second webpage, the user computing device 410 sends a second request 460 to the proxy website server 430. Depicted in FIG. 4 is a time period 445 during which at least a portion the website server 440 is unavailable to service a request from the user computing device 410 due to a high volume of use. At block 461, the proxy website server 430 makes a decision as to whether request 460 should be passed on to the website server 440. At the time that proxy website server 430 makes a decision whether to pass request 460 to website server 440, website server 440 may not be unavailable yet or the proxy website server 430 may not be aware that the website server 440 is not available. In the particular embodiment shown in FIG. 4, the website proxy server 430 determines 461 to send request 462 to the website server 440. However, after the website server 440 receives the request 462, at block 463, the website server 440 is unable to service the request and sends a response 464 to the website proxy server 430. The response 464 can indicate that the website server 440 is unable to service the request 462. In one embodiment, response 464 is an HTTP 503 error response. After receiving response 464, website proxy server 430 sends a response 466 to the user computing device 410. In some embodiments, the response 466 can include any or all of an indication that the requested webpage is not available, an indication of a time at which the requested webpage is available, an indication of a portion of the website that is available to be serviced by website server 440, and the like. Various embodiments of such a response are described in more detail below. At block 467, the user computing device 410 displays an error message, with some or all of the information provided by the proxy website server 430 in the response 466.

At block 468, a third request 469 may be sent from user computing device 410 to proxy website server 430. The third request 469 may be initiated by a user selecting a link to a webpage or service associated with the website, by a user browsing to a webpage address associated with the website, by a browser of the user computing device 410 after a specific period of time, or by any other action. After receiving the third request 469, the proxy website server 430 decides 470 whether to pass request 469 to website server 440. In the particular embodiment shown in FIG. 4, the website proxy server 430 determines 470 to send request 471 to the website server 440. For example, while the proxy website server 430 may have information that the website server 440 is still operating at or near capacity, the request 469 from user computing device 410 may include information which the website proxy server 430 takes into consideration. For example, the information in the request 469 may include a cookie identifying the user making the request 469, an indication of an IP address of the user computing device 410, an indication of session information regarding a user's previous activity, any other such information, or any combination thereof. Based on such information, the website proxy server 430 may give priority to the request 469 from user computing device 410 and decide 470 to send request 471 to the website server 440, even if website proxy server 430 has information that website server 440 is already operating at or near capacity. In the particular embodiment shown in FIG. 4, the website server 440 is unable to service the request 471. For example, website server 440 may be unable to even process priority requests at the time that it receives request 471. At block 472, website server 440 sends a response 473 to proxy website server 430 indicating that the website server 440 in unable to process request 471. At block 474, website proxy server 430 sends a response 475 to user computing device 410 indicating that the website server 440 in unable to process request 469. When user computing device 410 receives response 475, it displays 476 an error message with some or all of the information provided by the proxy website server 430 in the response 475.

At block 477, a fourth request 478 may be sent from user computing device 410 to proxy website server 430. The fourth request 478 may be initiated by a user selecting a link to a webpage or service associated with the website, by a user browsing to a webpage address associated with the website, by a browser of the user computing device 410 after a specific period of time, or by any other action. After receiving the fourth request 478, the proxy website server 430 decides 479 whether to pass request 478 to website server 440. In the particular embodiment shown in FIG. 4, the website proxy server 430 determines 479 to send request 480 to the website server 440. In the embodiment shown in FIG. 4, although website server 440 is generally operating at or near capacity during time 445, the website server 440 is able to service the request 480. At block 481, the website server 440 services the request and sends a response 482 to the website proxy server 430. The website proxy server 430 receives the response 482 from the website server 440 and sends 483 a corresponding response 484 to the user computing device 410. The response 484 can include information for displaying the requested webpage. After receiving the response 484, the user computing device 410 displays 485 the requested webpage.

As mentioned above with respect to the embodiments depicted in FIGS. 3 and 4, a proxy website server can determine whether to pass requests from user computing devices to a website server. Such determinations can be made based on a usage level of a website server with respect to capacity of the website server. In one embodiment, a proxy website server can measure current usage of at least a portion of the website server against a predetermined threshold. For example, a predetermined threshold can be 95% usage of capacity, where the website server can be determined to be unavailable if demand for at least a portion of the website server is at or above 95% of capacity. In another embodiment, a proxy website server can be configured to make a predictive estimate of the usage of the website server based on a number of requests being received from user devices or based on an expected number of requests being received.

Determinations by a website proxy server can be made based on information received from a website server. The website server may provide information to the proxy website server indicating one particular service which is operating at or near capacity and is generally unavailable for use. For example, in the case of a retail website, the website server may provide information to the proxy website server that a portion of the website server which allows customers to browse for retail items and add items to an online cart is available while a portion of the website server which allows users to checkout and pay for their purchases is operating at or near capacity. In this particular example, the proxy website server can determine that requests from user computing devices for browsing and adding items to online carts should be passed on to the website server while requests from user computing devices for checking out and paying for purchases should be not be passed on to the website server until additional capacity is added or demand decreases. The website server may also provide information to the proxy website server indicating changes to capacity or usage of the website server.

Determinations by a proxy website server can be made based on information about the request itself. In one embodiment, the proxy website server can taking into about information about the user computing device making the request or information about a user of the user computing device. Such information could include any or all of an IP address of the user computing device, a geographic location of the user computing device, the time of day at the location of the user computing device, an indication that the user has a premium account associated with the website, an indication of the capabilities of the user computing device or the type of browser operating on the user computing device, any other similar information, or any combination thereof. For example, a proxy website server may receive requests from multiple user computing devices that include the IP addresses of the requesting user computing device. Based on IP addresses, the proxy website server can determine a geographic location of each of the requesting user computing devices. During a period of high usage of the website, one of the requests may come from a user computing device in New York at 9:30 a.m., Eastern time, while another request may come from a user computing device in California at 6:30 a.m., Pacific time. It may be that users are more likely to make a purchase on a website after 8:00 a.m. In such a case, the proxy website server may determine that, based on the high level of usage and the likelihood of each user computing device to make a purchase, the request from the user computing device in New York should be passed on to the website server while the request from the user computer device in California should not be passed on to the website server. In another example, the proxy website server may receive a request from each of two user computing devices. The first request may indicate that a user of the first user computing device has a premium account with the website and the second request may indicate that a user of the second user computing device does not have a premium account with the website. When the first and second accounts are received, the website usage may be over a predetermined threshold at which the proxy server is configured to pass requests from premium users to the website server but not pass requests from non-premium users to the website. In such a case, the proxy website server may pass the first request to the website server while not passing the second request to the website server. In another embodiment, information from the user computer device may indicate that the request is a non-productive or malicious request, such as a request from a web bot, a web crawler, a computer virus, and the like. The proxy website server may be configured to not pass along malicious requests and to pass along non-productive requests only when the website server usage is below a certain threshold. Any other combination of information about the user computing device making the request or information about a user of the user computing device may be used in determining whether to pass requests from user computing devices to a website server.

Determinations by a proxy website server can be made based on information about the session in which the user computing device is engaged. The request from a user computing device to a proxy website server can include information identifying a session or information about the session. Session information can include any or all of set of webpages from the website that the user computer device has visited, a set of services from that website that the user has requested, information about activities that the user has engaged in while browsing on the website, and so on. For example, with a retail website, session information may indicate that a first user computer device has browsed to detail pages of retail items without placing any items in an online cart, while a second user computing device has browsed to detail pages of retail items and placed a number of items in an online cart. If the usage of the website does not allow for all user requests to be serviced, the proxy website server may not pass user requests from the first user computing device to the website server while the proxy website server may pass user requests from the second user computing device to the website server. This would increase the likelihood that those user computing devices which will make a purchase at the website are serviced by the website server.

Determinations by a proxy website server can be made based on an artifact of a request or a perceived intent of a request. An artifact of a request can be some item provided with the request, such as a cookie. A cookie can include information about a previous session of the user computing device, login information from the user computing device, or other information. Another artifact of the request can be the nature of the request, such as whether the request is a GET or a POST. With a GET request, it may be more likely that the user computing device is performing some passive activity, such as browsing detail pages of retail items. With a POST request, it may be more likely that a user computing device is performing some active activity, such as adding an item to a cart or checking out. The decision of a proxy website server as to whether a user request should be passed on could be based on any of these artifacts of the request. A perceived intent of a request can be evident from the request itself. For example, if the request is to browse to a view of the user computing device's online card, a perceived intent could be that the user is attempting to make a purchase. In another example, if the request is to browse from an order review page to a shipping information page, a perceived intent could be that the user is proceeding with a checkout. The decision of a proxy website server as to whether a user request should be passed on could be based on any perceived intent of the request.

Determinations by a proxy website server can be made based on any combination of the above-described information. For example, a proxy website server can receive a first request that is a GET request sent from a user computing device having an IP address associated with a foreign country with no previous session information, a second request that is a POST request from a user computing device having a domestic IP address and previous session information indicating that the user computing device has merely been browsing retail items, and a third request that is a POST request from a user computing device having an IP address associated with a foreign country and information identifying the user as a premium account user that makes frequent purchases. If the website is a retail site that only ships products domestically, the proxy website server may give the lowest priority to the first request since it is a GET request from a foreign country. The proxy website server may give the highest priority to the third request since, despite the fact that the user computing device is location in a foreign country, the third request is associated with a premium account user that frequently makes purchases and would be likely to make another purchase. The proxy website server may give an intermediate priority to the second request since it is more likely that a domestic POST of the second request would lead to a sale than the foreign GET of the first request. Any number of other combinations of information may be used by a proxy website server to determine whether a user request should be passed on to a website server.

As mentioned above with respect to the embodiments depicted in FIGS. 3 and 4, an error response can be sent from a proxy website server to a user computing device. The error response can be sent to the user computing device when the proxy website server does not pass a request from a user computing device to the website server. The error response can be sent to the user computing device when the proxy website server receives an error message from a website server indicating that the website server did not process a request from the user computing device. The error response sent from the proxy website server to the user computing device can provide information about the error to keep the user informed about the nature of the website unavailability, an estimated amount of time until the website will be available, partial services of the website that are available, and other options available to a user. In some embodiments, the error response page is intended to keep the user informed, to encourage users to stay at the website, and to provide options for website services to be performed at a later time.

Figure 5:
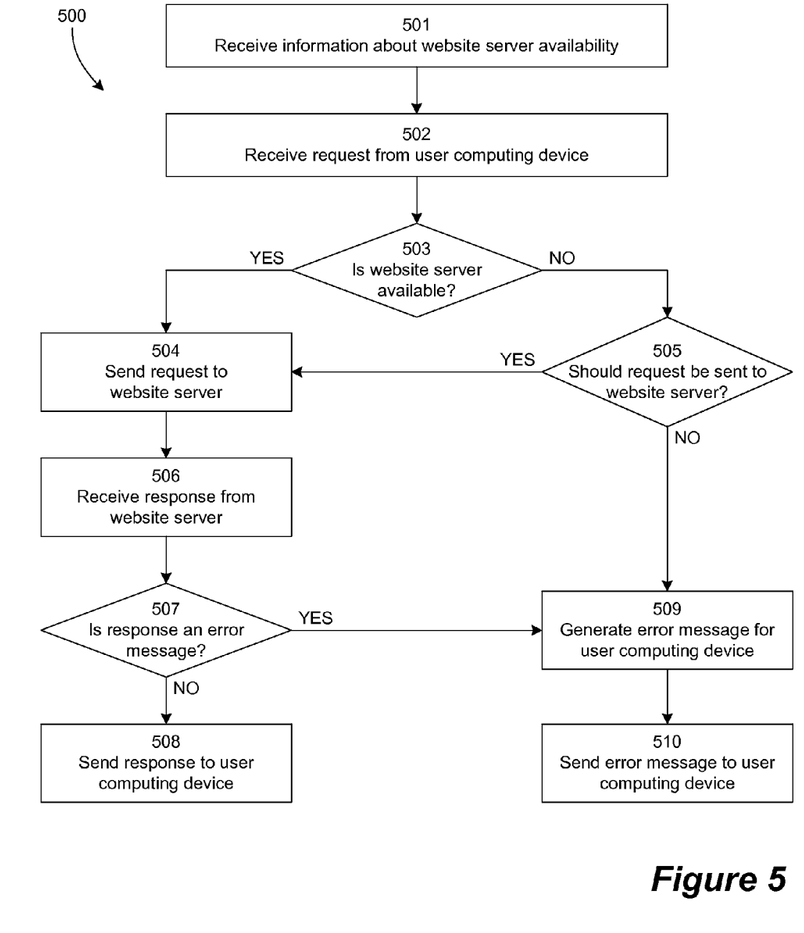
FIGS. 5 and 6 depict embodiments of a method of handling a request for a website by a proxy website server.

FIG. 5 depicts an embodiment of a method 500 of handling a request for a website by a proxy website server. A proxy website server can receive 501 information about website server availability. The information can be any or all of information about a capacity of the website server, a current usage level of the website server, a threshold level, and any similar information. The proxy website server can also receive 502 a request from a user computing device for accessing a webpage or a service of a website server. The proxy website server can determine 503 whether the website server is available. As discussed above, a determination about whether the website server is available can be based on a predetermined level of either actual or estimated usage of the website server. If the proxy website server determines 503 that the website server is available, then the proxy website server sends 504 the request to the website server. If the proxy website server determines 503 that the website server is not available, then the proxy website server determines 505 whether the request should be sent the website server. As discussed above, this determination can be based on information about the request itself, information about the session in which the user computing device is engaged, an artifact of a request or a perceived intent of a request, or any combination thereof. If the proxy website server determines 505 that the request should be sent the website server, then the proxy website server sends 504 the request to the website server. After sending 504 the request to the website server, the proxy server receives 506 a response from the website server. The proxy website server can determine 507 whether the response from the website server is an error message. If the response from the website server is not an error message, then the proxy website server sends 508 the response to the user computing device. If the proxy website server determines 505 that the request should not be sent to the website server, or if the proxy website server determines 507 that a response from the website server is an error message, the proxy website server can generate 509 an error message for the user computing device. The error message for the user computing device can include an indication that the website server is not available, an estimated amount of time until the website will be available, an indication that a portion of the website server is available, instructions for a browser of the user computing device to automatically retry the request after an amount of time, and the like. After the proxy website server generates 509 an error message for the user computing device, the proxy website server sends 510 the generated error message to the user computing device.

Figure 6:
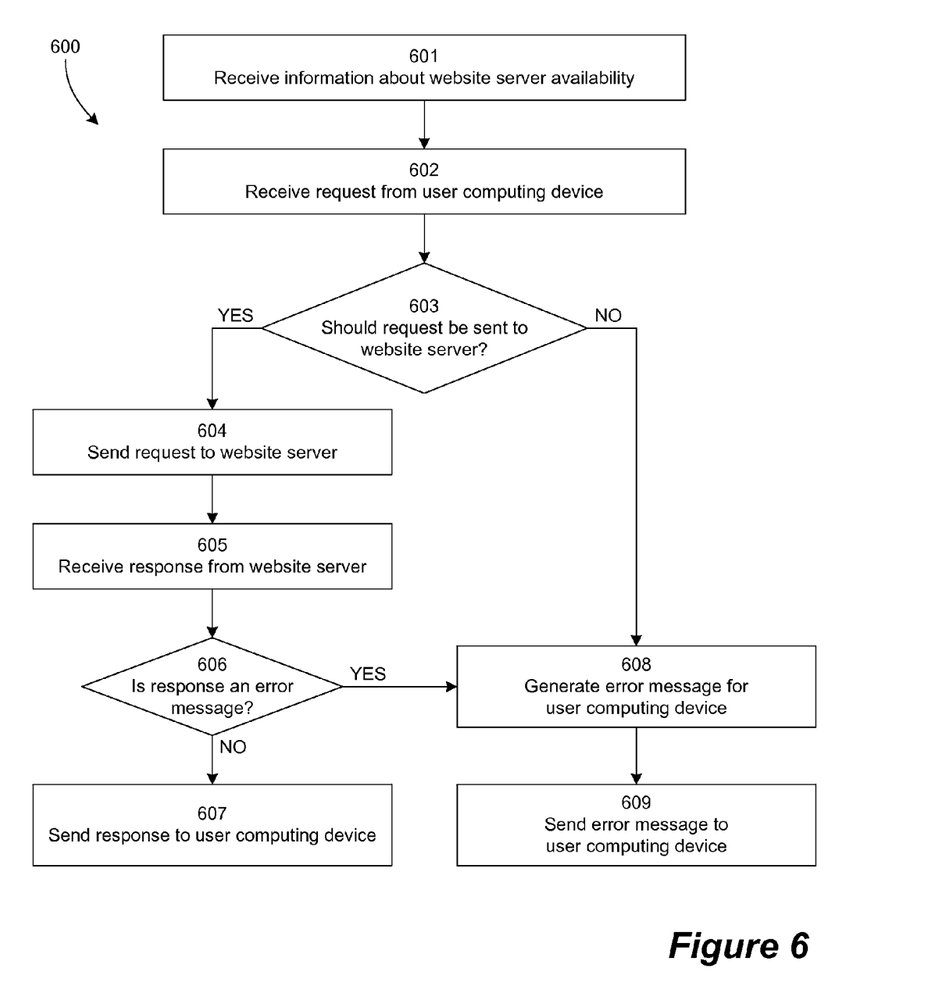

FIG. 6 depicts an embodiment of a method 600 of handling a request for a website by a proxy website server. A proxy website server can receive 601 information about website server availability. The proxy website server can also receive 602 a request from a user computing device for accessing a webpage or a service of a website server. The proxy website server can determine 603 whether the request should be sent the website server. In this embodiment, the determination 603 whether the request should be sent the website server can take into account both the availability of the website and information about the user, the user computing device session, and artifacts of the request in the determination. In one example, if a usage of the website server is over a first threshold, such as 80%, the proxy website server could determine that requests from user computing devices should not be sent to the website server unless they originate from users with premium accounts or unless the session history of the user computing device indicates that the user will likely make a purchase. If the usage of the website server is over a second threshold, such as 90%, the proxy website server could determine that request from user computing devices should not be sent to the website server unless the request is to make a payment. If the proxy website server determines 603 to send the request to the website server, then the proxy website server sends 604 the request to the website server. After sending 604 the request to the website server, the proxy server receives 605 a response from the website server. The proxy website server can determine 606 whether the response from the website server is an error message. If the response from the website server is not an error message, then the proxy website server sends 607 the response to the user computing device. If the proxy website server determines 603 that the request should not be sent to the website server, or if the proxy website server determines 606 that a response from the website server is an error message, the proxy website server can generate 608 an error message for the user computing device. After the proxy website server generates 608 an error message for the user computing device, the proxy website server sends 609 the generated error message to the user computing device.

Figure 7:
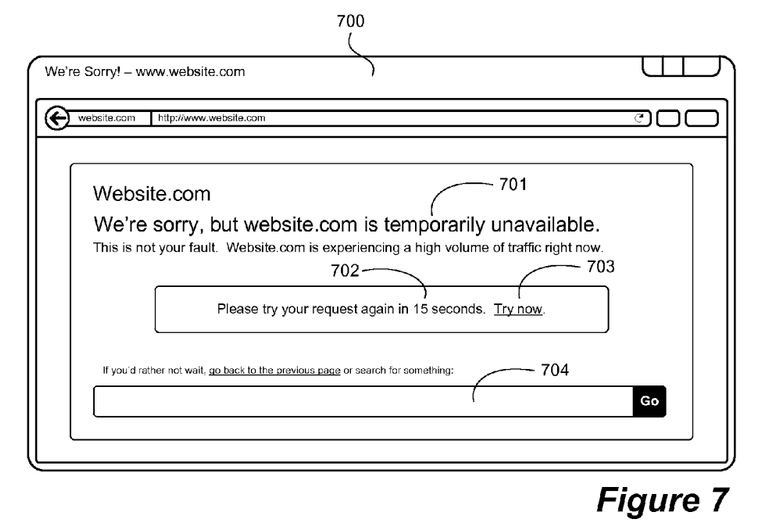
FIGS. 7, 8, 9, and 10 depict embodiments of error pages that can be sent to and displayed by a user computing device.

FIG. 7 depicts one embodiment of an error page sent to and displayed by a user computing device. More specifically, FIG. 7 depicts a browser window 700 with an indication that the website is temporarily unavailable 701 and an indication of an estimated time 702 until the website will be available. The displayed estimated time 702 may be a dynamic field, such as a counter, where the remaining time counts down until the estimated time expires. The displayed estimated time 702 may also be a static field that displays only the original estimated time. As depicted in the embodiment of FIG. 7, an error page may also include a link 703 which allows the user to immediately retry the previously-failed request. When the proxy website server sends the error message to the user computing device, the error message may include indications of services of the website that are still available. In the embodiment depicted in FIG. 7, a search box 704 is displayed indicating to the user that the search functionality of the website is still available. If the search functionality of the website is not available, browser window 700 could be sent without search box 704.

Figure 8:
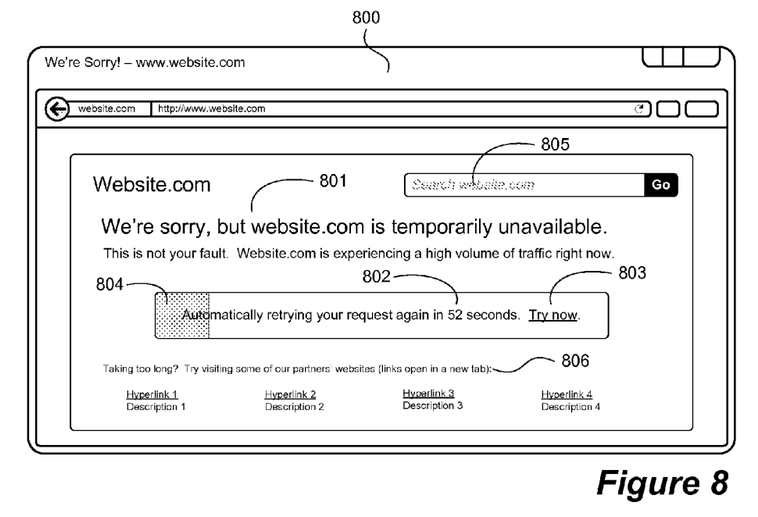

FIG. 8 depicts another embodiment of an error page sent to and displayed by a user computing device. More specifically, FIG. 8 depicts a browser window 800 with an indication that the website is temporarily unavailable 801 and an indication of an estimated time 802 until the website will be available. In the embodiment depicted in FIG. 8, an error page may also include a link 803 which allows the user to immediately retry the previously-failed request. The error message sent from the proxy website server to the user computing device may configure the browser to automatically resend the request to the proxy website server after the estimated amount of time expires. In the embodiment depicted in FIG. 8, the browser window 800 includes a status bar 804 indicating the portion of the estimated amount of time that has expired. The status bar 804 can move, such as from left to right in the embodiment depicted in FIG. 8, to provide a reference for the user as to how much of the estimated time has passed. In the embodiment depicted in FIG. 8, a search box 805 is displayed indicating to the user that the search functionality of the website is still available. Browser window 800 can also include links 806 to other websites which the user may be able to access while the user is waiting for the website to become available. In one embodiment, the links 806 are to partner websites of the website that is currently unavailable. In another embodiment, the browser is configured to open the links in a new tab or window so that the countdown of the estimated time continues and the browser can automatically retry the user's request while the user is browsing another website.

Figure 9:
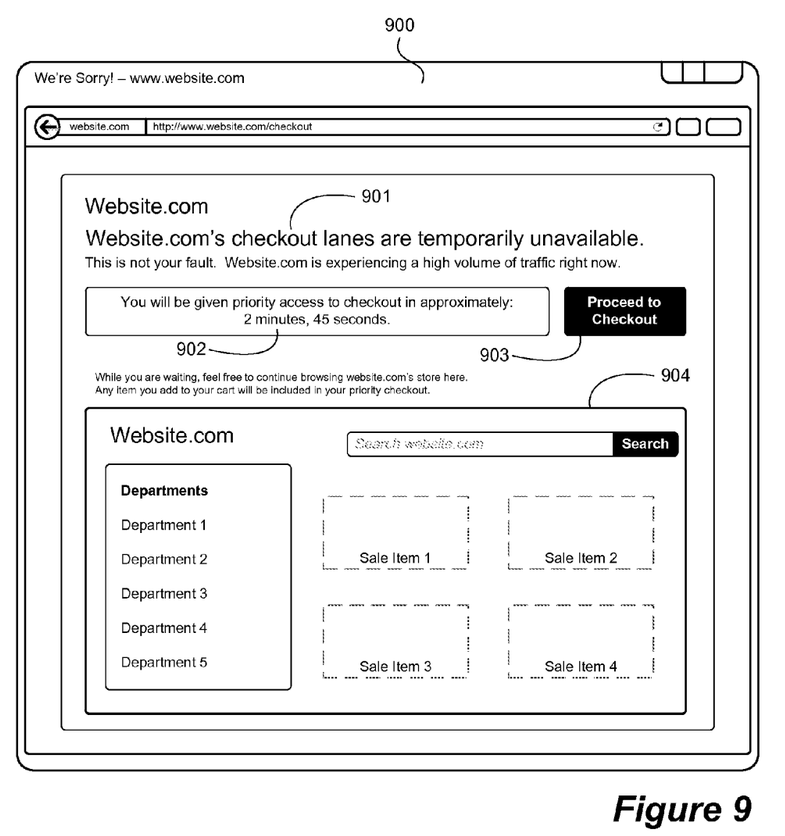

FIG. 9 depicts another embodiment of an error page sent to and displayed by a user computing device. More specifically, FIG. 9 depicts a browser window 900 at a time when a portion of the website, such as a checkout service, is unavailable while another portion of the website, such as the ability to browse retail items, is available. Browser window 900 includes in indication of the portion of the website that is temporarily unavailable 901 and an indication of an estimated time 902 until that portion of the website will be available. Browser window 900 can also include a command button 903 which allows a user to retry the request. In one embodiment, the command button 903 is configured to be invisible or disabled until the estimated time 902 has expired, at which time the command button would be visible and enabled. In other embodiments, a user's selection of the command button 903 after expiration of the estimated amount of time 902 would result in a request being sent to a proxy website server with an indication that the request has a certain priority over other requests. When the proxy website server sends the error message to the user computing device, the error message may include indications of services of the website that are still available. Browser window 900 includes a frame 904 which allows the user to continue using the available portion of the website when the user waits for the unavailable portion to become available. In the specific embodiment in FIG. 9, the user may have attempted to checkout from a retail website when the checkout services were unavailable, resulting the error page 900 being displayed. However, the services of the website related to browsing detail pages of retail items and adding retail items to an online shopping cart may be available. The frame 904 allows the user to continue browsing detail pages of retail items and adding retail items to an online shopping cart while the user waits for the checkout services to become available. In other embodiments, frame 904 could include functionality which would is intended to discourage a user from browsing away from the error page during the time that the website server is unavailable. For example, frame 904 could include an interactive game. In other examples, frame 904 could display recent news stories, weather, or any other type of information or activity to occupy the user while waiting for the website server to become available. In another example, a frame 904 could provide functionality which would allow the user to browse to any other webpage within the frame. In this last embodiment, the user would be able to browse to other websites without leaving the error page.

Figure 10:
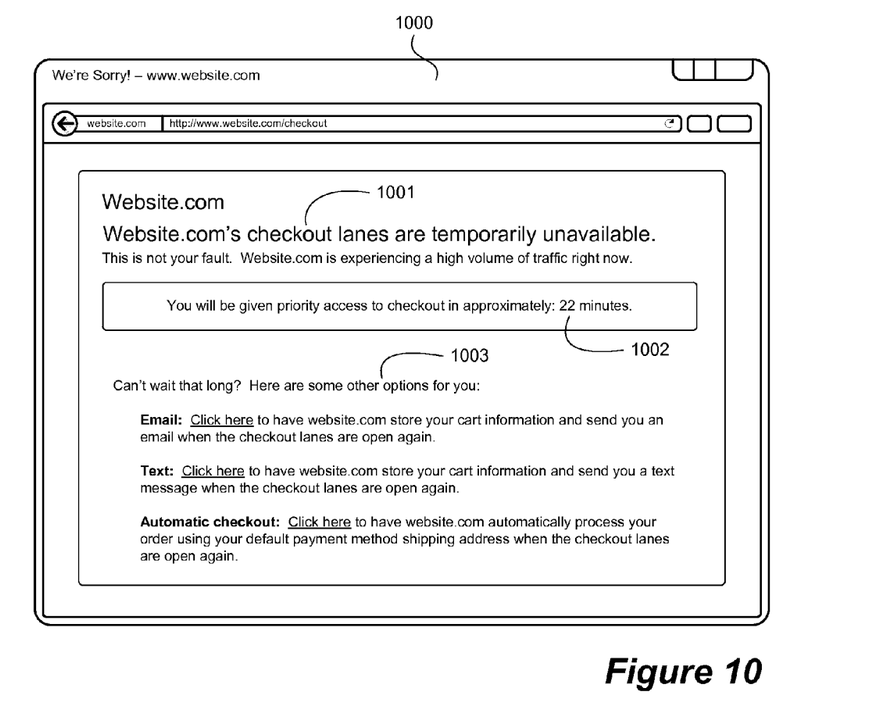

FIG. 10 depicts another embodiment of an error page sent to and displayed by a user computing device. More specifically, FIG. 10 depicts a browser window 1000 at a time when a portion of the website, such as a checkout service, is unavailable. Browser window 1000 includes in indication of the portion of the website that is temporarily unavailable 1001 and an indication of an estimated time 1002 until that portion of the website will be available. Browser window 1000 can also include a number of other options 1003 which are available to the user. In the specific embodiment in FIG. 10, the user may have attempted to checkout from a retail website when the checkout services were unavailable, resulting the error page 1000 being displayed. The other options 1003 available to the user can include an option that a message, such as an email message or a text message, be sent to the user when the checkout services are available. The message can include a link that, when selected, browses the user to the checkout service with all of the user's items still in an online cart. The other options 1003 available to the user can include an option that the order be processed at a later time using default information already known to the website. The default information already known to the website can include a default payment option, such as a credit card, a default shipping address, and a default shipping method. If any of these alternative options are selected by the user, a new request can be sent to the proxy website server indicating the alternate option requested by the user. The proxy website server can queue such requests until the website server is available and then process the queued requests. The proxy website server can also send such optional requests to a portion of the website server which will queue the requests and process them when the currently-unavailable portion of the website becomes available.

In some embodiments, the error page send to a user computing device can include JavaScript code which allows a browser of a user computing device to perform certain actions. For example, the error page can include an estimated amount of time until the website server will be available and the error page can include JavaScript code which can instruct a browser to repeat a failed request after the estimated amount of time has passed. In another example, the error page can include JavaScript code for a game which the browser can display in a frame and which the user can play while waiting for the estimated amount of time to pass before the user is available. In another example, the error page can include JavaScript code for displaying an animation, such as the status bar 804 in the embodiment depicted in FIG. 8 which provides the user with context for the amount of the estimated amount of time that has passed, a video intended to discourage the user from browsing to another page, or any other form of audiovisual material.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system for handling requests for services from a website server, the system comprising one or more memories having computer readable instructions that, upon execution, at least cause the system to:
   in response to receiving, from a user computing device, a first request for a webpage or a service provided by at least a portion of a website server, determine that usage of the at least a portion of the website server at a first time exceeds a capacity threshold;
   determine not to send the first request to the website server based, at least in part, on the usage of the at least a portion of the website server exceeding the capacity threshold at the first time;
   send a first error message to the user computing device, the first error message comprising an indication that the at least a portion of the website server is not available and a first estimated time until the website server is available;
   in response to receiving, from the user computing device, a second request for the webpage or the service provided by the at least a portion of a website server, determine that usage of the at least a portion of the website server at a second time exceeds the capacity threshold;
   determine not to send the second request to the website server based, at least in part, on the usage of the at least a portion of the website server exceeding the capacity threshold at the second time; and
   send a second error message to the user computing device, the second error message comprising an indication that the at least a portion of the website server is not available and a second estimated time until the website server is available.

2. The system of claim 1, further configured to:
   in response to receiving, from the user computing device, a third request for a webpage or a service provided by at least a portion a website server, determine that usage of the at least a portion of the website server at a third time does not exceed the capacity threshold; and
   send the third request to the website server.

3. The system of claim 1, further configured to:
   determine a priority of one of the first and second requests based on at least one of information about the user computing device, information about a user of the user computing device, information about the current session of the user computing device, an artifact of the third request, and a perceived intent of the third request; and
   determine whether to send the one of the first and second requests to the website server based, at least in part, on the determined priority.

4. The system of claim 3, further configured to:
   determine that usage of the at least a portion of the website server at either the first time or the second time does not exceed the capacity threshold;
   wherein the system is configured to determine whether to send the one of the first and second requests to the website server based, at least in part, on the priority of the third request and the usage of the at least a portion of the website server at the third time not exceeding the capacity threshold.

5. The system of claim 1, wherein the first estimated time is less than the second estimated time.

6. The system of claim 1, wherein the first error message comprises instructions for a browser of the user computing device to automatically send the second request in response to the first estimated time elapsing.

7. The system of claim 1, wherein at least one of the first error message and the second error message comprises instructions for a browser of the user computing device to display at least one portion or service of the website server that is available.

8. The system of claim 7, wherein the browser is configured to allow the user to continue using the at least one portion or service of the website server that is available while displaying a running counter of the first or second estimated time.

9. The system of claim 7, wherein the portion or service of the website server that is available comprises a search function.

10. The system of claim 1, wherein at least one of the first error message and the second error message comprises instructions for a browser of the user computing device to display an interactive game.

11. A method for handling requests for services from a website server, comprising:
in response to receiving, from a user computing device, a request for the at least a portion of the website server, determining a usage level of the website server based on feedback from the website server and a perceived intent of the request based on previous interactions of the user computing device with the website server;
determining whether to send the request to the website server based, at least in part, on the usage level of the website server with respect to a threshold level and the perceived intent; and
sending a response to the user computing device, the response comprising at least one of a response from the at least a portion of the website server or an error message.

12. The method of claim 11, wherein the request comprises an artifact and wherein determining whether to send the request is further based, at least in part, on the artifact.

13. The method of claim 11, wherein the request comprises an indication of a user, wherein determining whether to send the request is further based, at least in part, on whether the user indicated in the request is associated with a premium account.

14. The method of claim 11, wherein determining whether to send the request is further based, at least in part, on information about a session of the user computing device.

15. The method of claim 11, wherein the usage level of at least a portion of the website server is based on one or more of an actual usage level, an estimated usage level, or an expected usage level.

16. A non-transitory computer-readable storage medium having stored thereon computer readable instructions, the computer-readable instructions comprising instructions that, upon execution on one or more computing devices, at least cause:
in response to receiving, from a user computing device, a request for a webpage or a service provided by a first portion of a website server, determining, based on a usage level of the first portion of the website server with respect to a threshold level, that the first portion of the website server is unavailable;
determining that a second portion of the website server is available;
generating an error response comprising a first indication that the first portion of the website service is unavailable and a second indication that the second portion of the website service is available; and
sending the error response to the user computing device.

17. The computer-readable storage medium of claim 16, further comprising computer-readable instructions that, upon execution one the one of more computing devices, at least cause:
estimating an amount of time until the first portion of the website server will be available;
wherein the error response further comprises an indication of the estimated amount of time.

18. The computer-readable storage medium of claim 16 wherein the error response further comprises a third indication of a priority level, wherein the user computing device is configured to include the indication of the priority in a subsequent request.

19. The computer-readable storage medium of claim 16 wherein the error response further comprises a third indication of one or more options available to the user, the one or more options comprising an ability to submit a request for notification of a time when the first portion of the website server becomes available.

20. The computer-readable storage medium of claim 19, wherein the request for notification comprises a request for a text message to be sent when the first portion of the website server becomes available.

21. The computer-readable storage medium of claim 19, wherein the request for notification comprises a request for an email message to be sent when the first portion of the website server becomes available.

22. The computer-readable storage medium of claim 16 wherein the error response further comprises a third indication of one or more options available to the user.

23. The computer-readable storage medium of claim 22 wherein the one or more options comprise an ability to request queuing of the request for the webpage or service until a time when the first portion of the website server becomes available.

24. The computer-readable storage medium of claim 23, further comprising computer-readable instructions that, upon execution on the one of more computing devices, at least cause:
in response to receiving a request for queuing of the request for the webpage or service until a time when the first portion of the website server becomes available, queuing the request for the webpage or service;
determining that the first portion of the website server is available;
sending the request for the webpage or service to the first portion of the website; and
notifying the user computing device that the request for the webpage or service has been serviced by the first portion of the website.

* * * * *